(12) United States Patent
Dapkunas

(10) Patent No.: US 7,970,616 B2
(45) Date of Patent: Jun. 28, 2011

(54) EFFICIENT REVIEW OF DATA

(76) Inventor: Ronald M. Dapkunas, Ellicott City, MD (US)

(*) Notice: Subject to any disclaimer, the term of this patent is extended or adjusted under 35 U.S.C. 154(b) by 860 days.

(21) Appl. No.: 11/781,341

(22) Filed: Jul. 23, 2007

(65) Prior Publication Data

US 2009/0030669 A1    Jan. 29, 2009

(51) Int. Cl.
- G10L 11/00 (2006.01)
- G10L 21/06 (2006.01)
- G06F 17/27 (2006.01)
- G06F 17/21 (2006.01)

(52) U.S. Cl. ........... 704/270; 704/9; 704/10; 704/276
(58) Field of Classification Search ............ None
See application file for complete search history.

(56) References Cited

U.S. PATENT DOCUMENTS

| | | | | |
|---|---|---|---|---|
| 5,642,522 A * | 6/1997 | Zaenen et al. | 715/246 |
| 5,873,109 A * | 2/1999 | High | 715/243 |
| 6,279,018 B1 * | 8/2001 | Kudrolli et al. | 715/234 |
| 6,289,304 B1 * | 9/2001 | Grefenstette | 704/9 |
| 6,452,597 B1 * | 9/2002 | Goldberg et al. | 345/472 |
| 7,018,210 B2 * | 3/2006 | Goldman et al. | 434/172 |
| 7,069,207 B2 * | 6/2006 | Corston-Oliver et al. | 704/9 |
| 7,092,872 B2 * | 8/2006 | Polanyi et al. | 704/9 |
| 7,191,117 B2 * | 3/2007 | Kirby et al. | 704/9 |
| 7,503,001 B1 * | 3/2009 | Lekutai | 715/261 |
| 2006/0212789 A1 * | 9/2006 | Crowe et al. | 715/500 |

OTHER PUBLICATIONS

Euler, "Tailoring Text Using Topic Words: Selection and Compression", Proceedings of the 13th International Workshop on Database and Expert Systems Applications, pp. 215-222, 2002.*
Breeden, "It's easy to see that Vortex is frustrating to read", Government Computer News, Available at: http://gcn.com/Articles/1998/08/10/Its-easy-to-see-that-Vortex-is-frustrating-to-read.aspx?p=1, 1998.*
Spreeder.com, Web archive downloaded from archive.org, Available at: http://web.archive.org/web/20060901172824/http://www.spreeder.com/, Sep. 1, 2006.*

\* cited by examiner

*Primary Examiner* — Brian L Albertalli
(74) *Attorney, Agent, or Firm* — Capitol City TechLaw; Richard C. Irving

(57) ABSTRACT

A server may provide information to a processing device for displaying a parser user interface. The displayed parser user interface may include an input portal for inputting text input. The parser user interface may further include controls for selecting a level of compression. Upon selection of one of the controls, the server may process the text input and may produce text output which may include a placeholder symbol to replace specific words from the text input and/or abbreviated representations to replace other specific words from the text input. The server may send information to the processing device to display the produced text output, as well as other information. The server may further provide information to the processing device for displaying a speed reader user interface. The speed reader user interface may include controls for starting, stopping, and pausing a speed reading operation as well as other controls.

20 Claims, 10 Drawing Sheets

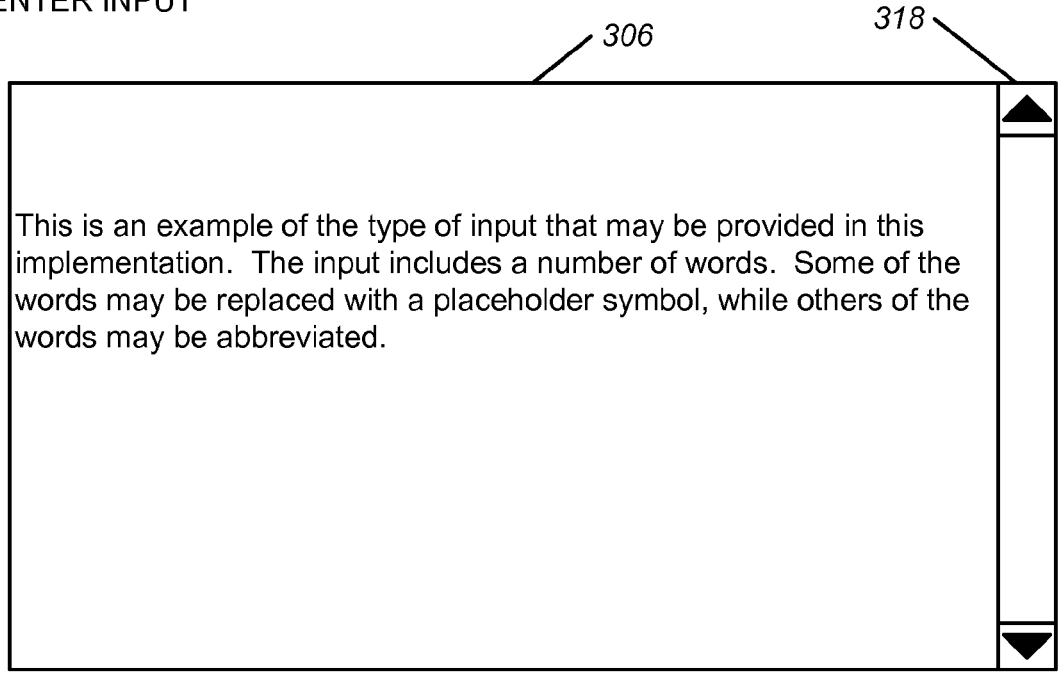
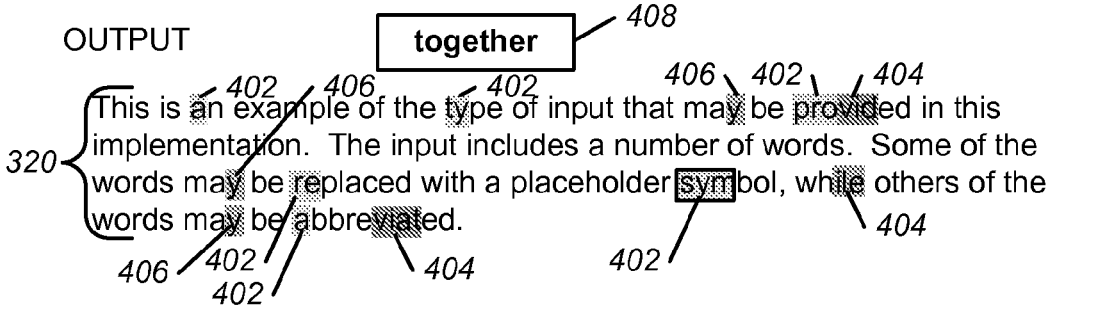
FIG. 4

EFFICIENT REVIEW OF DATA

BACKGROUND

Reviewing large amounts of written or verbal content in an effective manner has been and continues to be challenging for many people. Reviewing may be a time consuming process and a measure of effectiveness of an individual is how quickly the individual can perform a task, understand the written or verbal content and retain and recall critical portions of the written or verbal content.

Numerous tools/techniques may be employed by a user of a processing device, such as, for example, a personal computer (PC) or other processing device, to accelerate a speed at which the user may perform a task including: speed-reading training, which may focus the user on using a hand to guide eyes; focusing on primary themes of a work; creating outlines for review; analysis of different styles employed by professional editors (e.g. newspapers, technical manuals, fiction novels); running audio recordings at various speeds; or, simply listening and making written notes.

One challenge that presents itself is that users have ever increasing access to masses of information that, while interesting, curious or critical, may be difficult for the user to access and assimilate in an effective manner.

Formal languages are constructed in a specific format. Written and verbal expression of languages generally occur according to a formula. The languages express a message; the message itself is usually embedded within a mass of words, phrases and punctuation. By analogy, an article, such as, for example, a tapestry or mosaic, has a specific theme that is comprised of many threads or tiles, and while they are all important to a design and are intended to give the article a certain appeal to a viewer, a key figure or theme exists that an artist wants the viewer to absorb.

Written or verbal content is delivered to the user according to appropriate rules of a language that are employed. When delivering the content, a core message or theme can become cluttered. The user may search for core elements that may be critical to drawing a conclusion. When a mass of words and phrases is great, the user may take more time to examine the words and phrases and the user may have more difficulty in getting to a heart of the words and phrases.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a processing device may access a server via a network. The server may provide information to the processing device, such that the processing device may display a parser user interface. The displayed parser user interface may include a portal for receiving text input. In some embodiments, the processing device may include a speech recognition component for receiving speech input and converting the speech input to the text input.

The parser user interface may include selectable icons for selecting one of a number of levels of compression. Each of the levels of compression may be associated with a group of words to be deleted and replaced with a placeholder symbol and/or a group of words to be replaced with an abbreviated representation in produced text output.

The parser user interface may include a link to a speed reader user interface. The speed reader user interface may automatically receive the produced text output as input. In some embodiments, the speed reader user interface may include an input portal for entry of text input. Alternatively, the processing device may convert speech input to the text input using a speech recognition component. The speed reader user interface may display words, or groups of characters from the input, one at a time at a particular speed reading rate. The speed reader user interface may include controls for starting, stopping, and pausing a speed reading operation, increasing or decreasing the speed reading rate, as well as other or different controls.

DRAWINGS

In order to describe the manner in which the above-recited and other advantages and features can be obtained, a more particular description is described below and will be rendered by reference to specific embodiments, thereof, which are illustrated in the appended drawings. Understanding that these drawings depict only typical embodiments and are not therefore to be considered to be limiting of its scope, implementations will be described and explained with additional specificity and detail through the use of the accompanying drawings.

FIG. 4 illustrates an instance of the exemplary parser user interface in which a definition associated with at least a portion of a displayed word may be presented.

DETAILED DESCRIPTION

Figure 1:
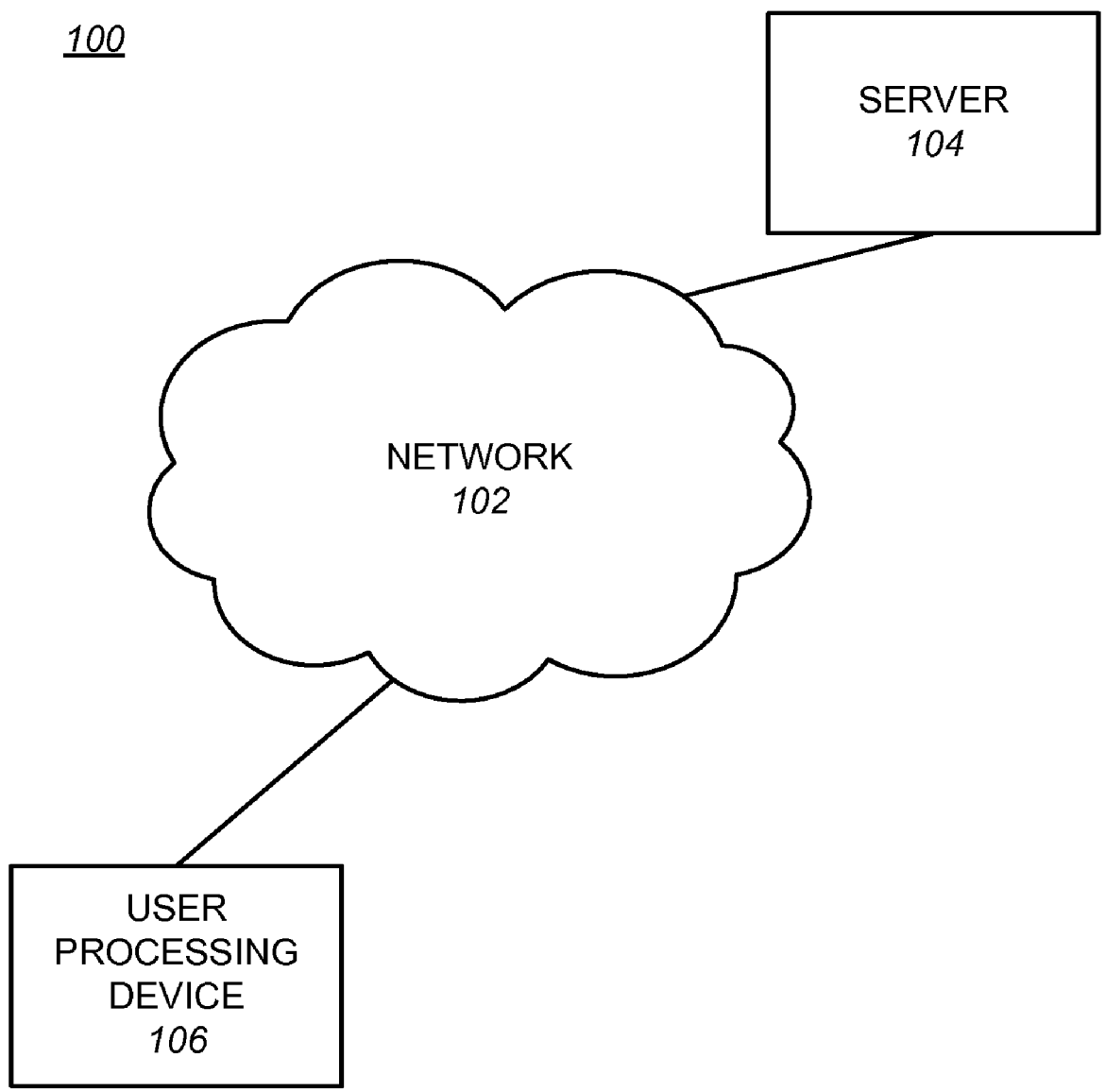
FIG. 1 illustrates an exemplary operating environment for embodiments consistent with the subject matter of this disclosure.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, a network-connected user processing device, such as, for example, a desktop personal computer (PC), a notebook PC, a handheld processing device, or other processing device, may access a server via a network. The server may present a parser user interface to a user via the network and the user processing device.

The parser user interface may include a portal or window for entry of language input including a group of words. In some embodiments, the language input may be provided as speech input, which the user processing device may convert to text via a speech recognition component. The parser user interface also may include multiple selectable icons, each of which may be associated with a respective specific group of words to be deleted and/or a group of words to be replaced by corresponding abbreviated representations. The parser user interface may also include a selectable icon for highlighting portions of words and a selectable icon for clearing the input group of words included in the portal or window.

When a user selects one of the multiple selectable icons, which may be associated with the respective specific groups of words to be deleted and the groups of words to be replaced by corresponding abbreviated representations, the server may produce a language output including at least some of the words of the language input, one or more placeholder symbols replacing words of the language input, which may match any one of the respective specific group of words to be deleted, and one or more abbreviated representations corresponding to one or more words of the language input. The language output may be presented to the user via the network and the user processing device.

In some embodiments, the server may produce a table showing each line of the language output in one column, and any words of the language input replaced by the placeholder symbol in a second column. The table may be presented to the user via the user processing device.

When the user selects one of the highlighted portions of the words, a corresponding meaning of the highlighted portion may be presented by the server to the user via the user processing device.

The user may select a speed reader link of the parser user interface, thereby causing a speed reader user interface to be presented to the user by the server via the user processing device. The speed reader interface may include an input portal or window, which may display words input to the speed reader user interface and may provide a means for the user to input words to the speed reader user interface. In one embodiment, when the user selects the speed reader user interface after having processed language input via the parser user interface, the produced language output of the parser user interface may automatically appear as input in the input portal or window of the speed reader user interface.

When processing words included in the input portal or window of the speed reader user interface, each of the processed words may be displayed, one at a time, at a specific window of the speed reader user interface.

In various embodiments consistent with the subject matter of this disclosure, the speed reader user interface may include one or more controls for controlling the processing of the words included in the input portal or window of the speed reader interface. The controls may include a control for starting and stopping the processing of the words included in the input portal or window, a control for decreasing a rate at which the processed words are displayed one at a time, a control for increasing a rate at which the processed words are displayed one at a time, a control to pause the processing of the words, a control to skip the processing of the words to a beginning of a next paragraph, a control to skip the processing of the words to a beginning of a previous paragraph, a control to clear the words included in the input portal or window, and/or other or different controls.

Exemplary Operating Environment

FIG. 1 illustrates an exemplary operating environment 100 for embodiments consistent with the subject matter of this disclosure. Operating environment 100 may include a network 102, one or more servers 104, and one or more user processing devices 106.

Network 102 may be a single network or a combination of networks, such as, for example, the Internet. Network 102 may include a wireless network, a wired network, a packet-switching network, a public switched telecommunications network, a fiber-optic network, other types of networks, or any combination of the above.

Server 104 may be a processing device or a group of processing devices configured to work together to provide a service via network 102. In embodiments in which server 104 includes a group of processing devices, the processing devices may be configured as a server farm.

User processing device 106 may be a user's processing device, such as, for example, a desktop personal computer (PC), a laptop PC, a handheld processing device, or other processing device.

Exemplary Processing Device

Figure 2:
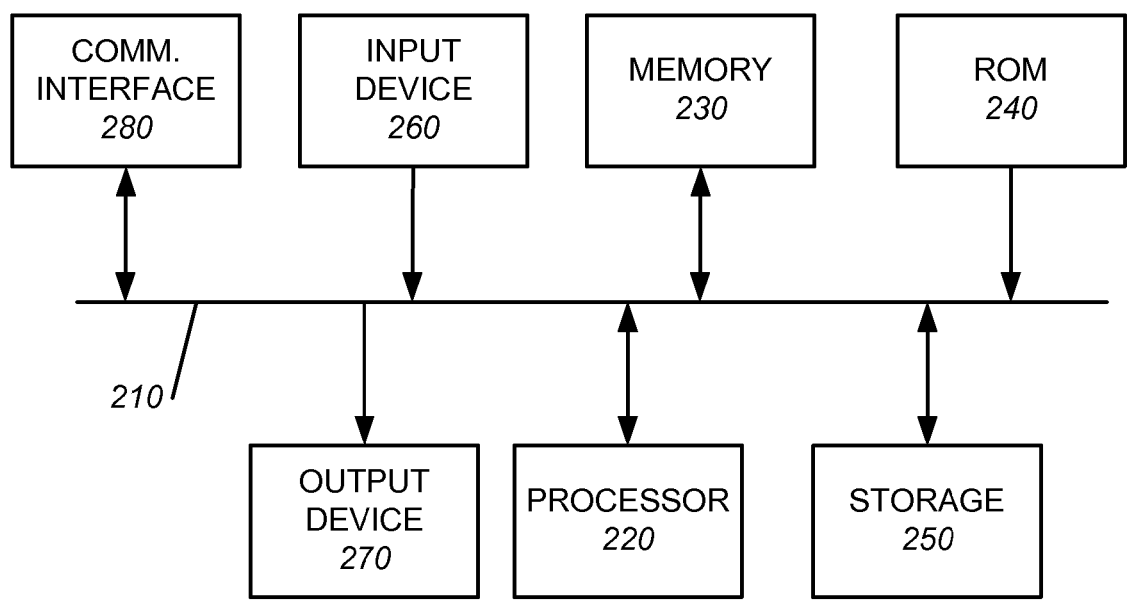
FIG. 2 is a functional block diagram of a processing device, which may implement a server or a user processing device shown in FIG. 1.

FIG. 2 is a functional block diagram of an exemplary processing device 200 that may be used to implement embodiments of server 104 and/or user processing device 106. Processing device 200 may include a bus 210, a processor 220, a memory 230, a read only memory (ROM) 240, a storage device 250, an input device 260, an output device 270, and a communication interface 280. Bus 210 may permit communication among components of processing device 200.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic media, optical media, or other medium, in embodiments consistent with the subject matter of this disclosure. In some embodiments, storage device 250 may include one or more databases.

Input device 260 may include one or more conventional mechanisms that permit a user to input information to processing device 200, such as a keyboard, a mouse, a pen, a voice recognition device, etc. Output device 270 may include one or more conventional mechanisms that output information to the user, including a display, a printer, one or more speakers, or a medium, such as, for example, a memory, a magnetic disk, an optical disk and a corresponding disk drive, or other medium. Communication interface 280 may include any transceiver-like mechanism that enables system 200 to communicate via a network. For example, communication interface 280 may include a modem, or an Ethernet interface for communicating via a local area network (LAN), or other network. Alternatively, communication interface 280 may include other mechanisms for communicating with other devices and/or systems via wired, wireless or optical connections.

Processing device 200 may perform such functions in response to processor 220 executing sequences of instructions contained in a machine-readable medium, such as, for example, memory 230, a magnetic disk, or an optical disk. Such instructions may be read into memory 230 from another machine-readable medium, such as storage device 250, or from a separate device via communication interface 280.

Exemplary Parser User Interface

Figure 3:
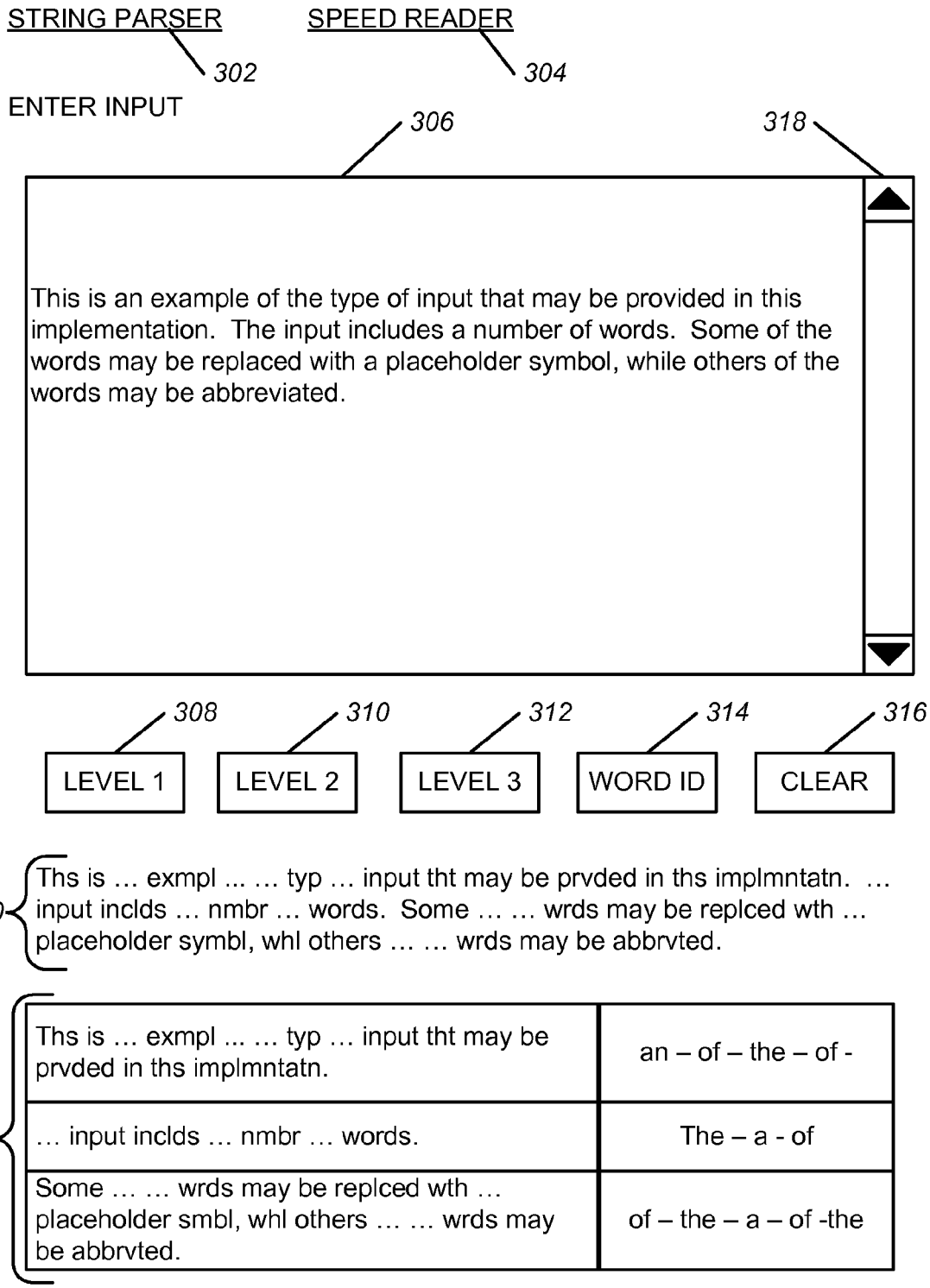
FIG. 3 illustrates an exemplary parser user interface in embodiments consistent with the subject matter of this disclosure.

FIG. 3 illustrates an exemplary parser user interface, which may be implemented in embodiments consistent with the subject matter of this disclosure. The parser user interface may include a string parser user interface link 302, a speed reader user interface link 304, an input portal or window 306, selectable icons 308, 310, 312 for selecting a level of compression, selectable icon 314 for highlighting at least a portion of one or more words, and selectable icon 316 for clearing input included in input portal 306.

In some embodiments, a user may enter textual input via input portal 306 displayed on a display screen of user processing device 106. The textual input may include groups of words, symbols, numbers, punctuations, as well as special characters. In one embodiment, the user may select and copy at least a portion of text from a displayed document by using a pointing device, such as a computer mouse, or other device, and may paste at least the selected portion of the text into input portal 306. The user may also input text to input portal 306 via other means, such as, for example, typing characters via a keyboard, providing speech input via a speech recognition component of user processing device 106 for conversion to text, or via other methods. Input portal 306 may include a scrollbar 318 by which a user may scroll displayed contents of input portal 306.

Selectable icons 308, 310, 312 may be selected by the user via the pointing device, or via other methods. Each of the selectable icons 308, 310, 312 may be associated with a respective group of words to be deleted from the entered input and/or a respective group of words to be replaced with corresponding abbreviated representations. In one embodiment, selecting selectable icon 308 may cause the language input included in input portal 306 to be processed to produce language output, in which words such as, for example, articles ("a", "the", "an") included in the language input are to be replaced by a placeholder symbol, such as, for example, " . . . " or another placeholder symbol, in the produced language output. In one example, when selectable icon 308 is selected, no words of the language input may be replaced in the produced language output by a corresponding abbreviated representation. When selectable icon 310 is selected, words of the language input included in input portal 306, such as, certain articles and adjectives ("a", "the", "an", "big", "small", "tall", etc.) may be replaced by the placeholder symbol in the produced language output and certain words included in the language input may be replaced in the produced language output by corresponding abbreviated representations. For example, "example" may be replaced by "exmpl", "abbreviated" may be replaced by "abbrvted", etc. When selectable icon 312 is selected, words of the language input included in input portal 306, such as certain articles, adjectives and adverbs (for example, "a", "the", "an", "big", "small", "tall", "slowly", "quickly", "lethargically", etc.) may be replaced by the placeholder symbol in the produced language output and certain words included in the language input may be replaced in the produced language output by corresponding abbreviated representations. For example, "example" may be replaced by "exmpl", "abbreviated" may be replaced by "abbrvted", "corresponding" may be replaced by "crrspndng", "number" may be replaced by "nmbr", etc.

In FIG. 3, exemplary language output 320 is shown having certain words abbreviated and other words replaced by the placeholder symbol. For example, in language output 320, "This" is replaced by "Ths", "an" is replaced by " . . . ", "of the" are replaced by " . . . . . . ", "type" is replaced by "typ", "of" is replaced by " . . . ", etc.

FIG. 4 illustrates an exemplary parser user interface after a user has selected selectable icon 314. As a result of selecting selectable icon 314, portions of words included in language output 320 may be highlighted. For example, prefixes 402, roots 404, and suffixes 406 may be highlighted, each in a separate shape or color. In one embodiment, prefixes may be highlighted in yellow, suffixes may be highlighted in green, and roots may be highlighted in blue. In other embodiments, other colors or shades may be used.

When the user selects a highlighted portion of a word, a corresponding meaning may be displayed. For example, suppose the user selects "sym" from language output 320 (FIG. 4), a corresponding meaning 408 ("together") may be displayed by user processing device 106.

In other embodiments, complete words that are included in a dictionary may be highlighted. Selection of one of the highlighted words may result in a meaning of the selected highlighted word being displayed.

Exemplary Speed Reader User Interface

Figure 5:
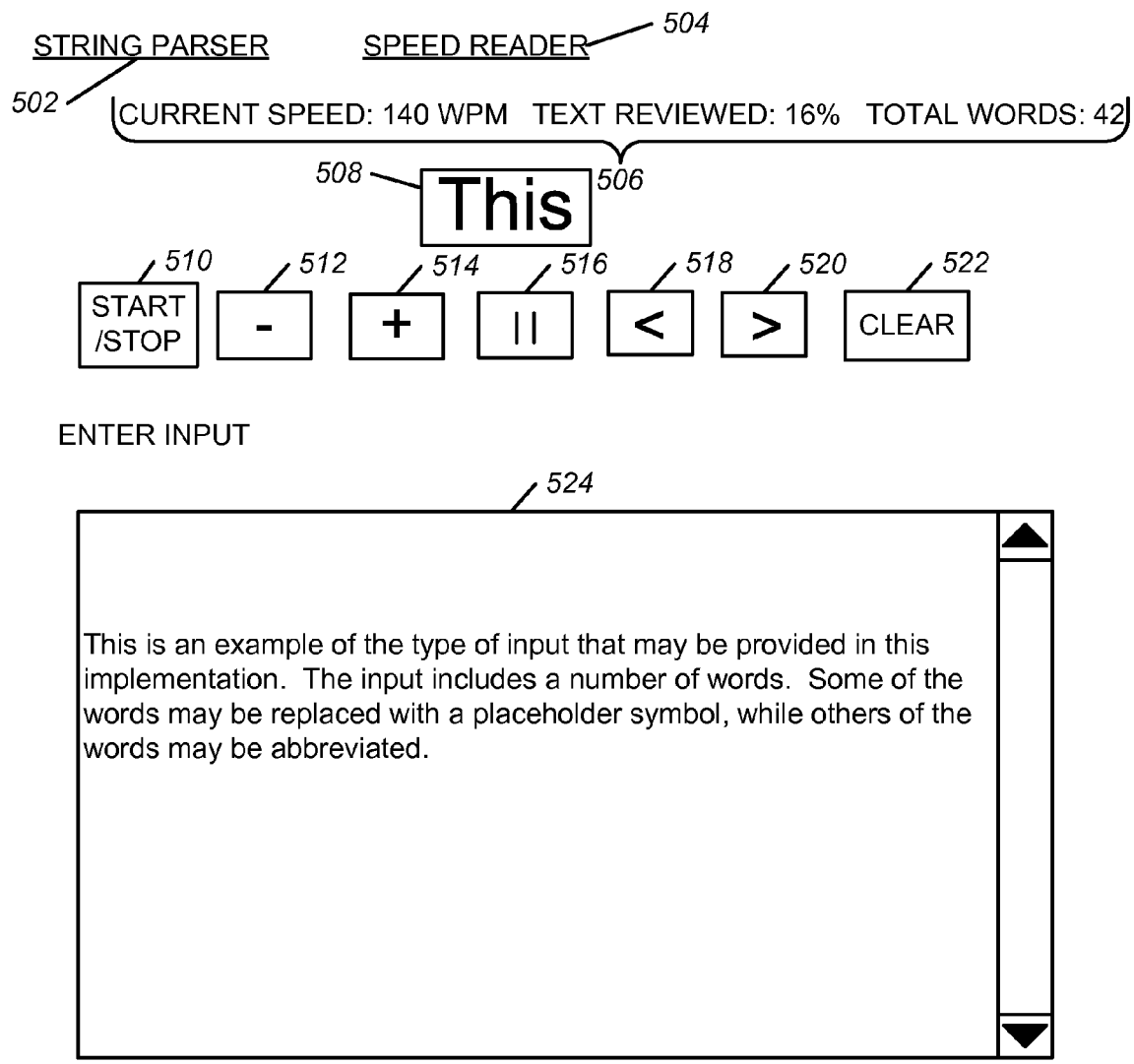
FIG. 5 illustrates an exemplary speed reader user interface in embodiments consistent with the subject matter of this disclosure.

FIG. 5 illustrates an exemplary speed reader user interface, which may be displayed on a display screen of user processing device 106, in embodiments consistent with the subject matter of this disclosure. The speed reader user interface may include a parser user interface link 502, a speed reader user interface link 504, window 508, controls 510, 512, 514, 516, 518, 520, 522 and a reader input portal 524.

The user may enter input for the speed reader user interface via reader input portal 524. The user may enter input text by typing on a keyboard, by using a pointing device or other device to copy and paste text from an electronic document or file, by providing speech input, which may be converted to text by a speech recognition component, or by other means. In some embodiments, when a user selects speed reader user interface 304 from the parser user interface, reader input portal 524 may automatically include input from language output 320.

Control 510 may be selected to either start or stop speed reading. For example, when speed reading is performed, control 510 may be selected to stop the speed reading. When speed reading is not currently being performed, control 510 may be selected to start the speed reading. When the speed reading is not currently being performed, control 510 may be labeled as "Start" in some embodiments.

Control 512 may be selected by the user to decrease a speed reading rate. In some embodiments, a default speed reading rate may be 120 words per minute, where a word may be a word in a particular language, an abbreviated representation of a word, a number, a placeholder, or other groups of characters or symbols. Other embodiments may have a different default speed reading rate. Each time control 512 is selected, the speed reading rate may decrease by a given number of words per minute, such as, for example, 10 words per minute or another suitable number of words per minute.

Control 514 may be selected by the user to increase the speed reading rate. Each time control 514 is selected, the speed reading rate may increase by a given number of words per minute, such as, for example, 10 words per minute or another suitable number of words per minute.

Control 516 may be selected by the user to pause the speed reading. When the speed reading is paused, selection of control 516 may cause the speed reading to resume.

Control 518 may be selected to cause the speed reading to skip back to a previous portion, such as, for example, a first word of a previous paragraph, or other portion preceding a current position. Control 520 may be selected to cause the speed reading to skip forward to a next portion, such as, for example, a first word of a next paragraph, or other portion following the current position. Selection of control 522 (or speed reader user interface link 504) may clear all input of reader input portal 524.

Window 508 may display a word, a placeholder, or an abbreviated representation corresponding to the current position. In some embodiments, the word, the placeholder, or the abbreviated representation may be displayed at a specific location of the speed reader user interface.

In some embodiments, the speed reader user interface may display reader information 506, which may include a current speed reading rate, a percentage of text reviewed, and a total number of words or groups of characters included in reader input portal 524. In other embodiments, reader information 506 may include other, or different information.

Exemplary Processing

Figure 6:
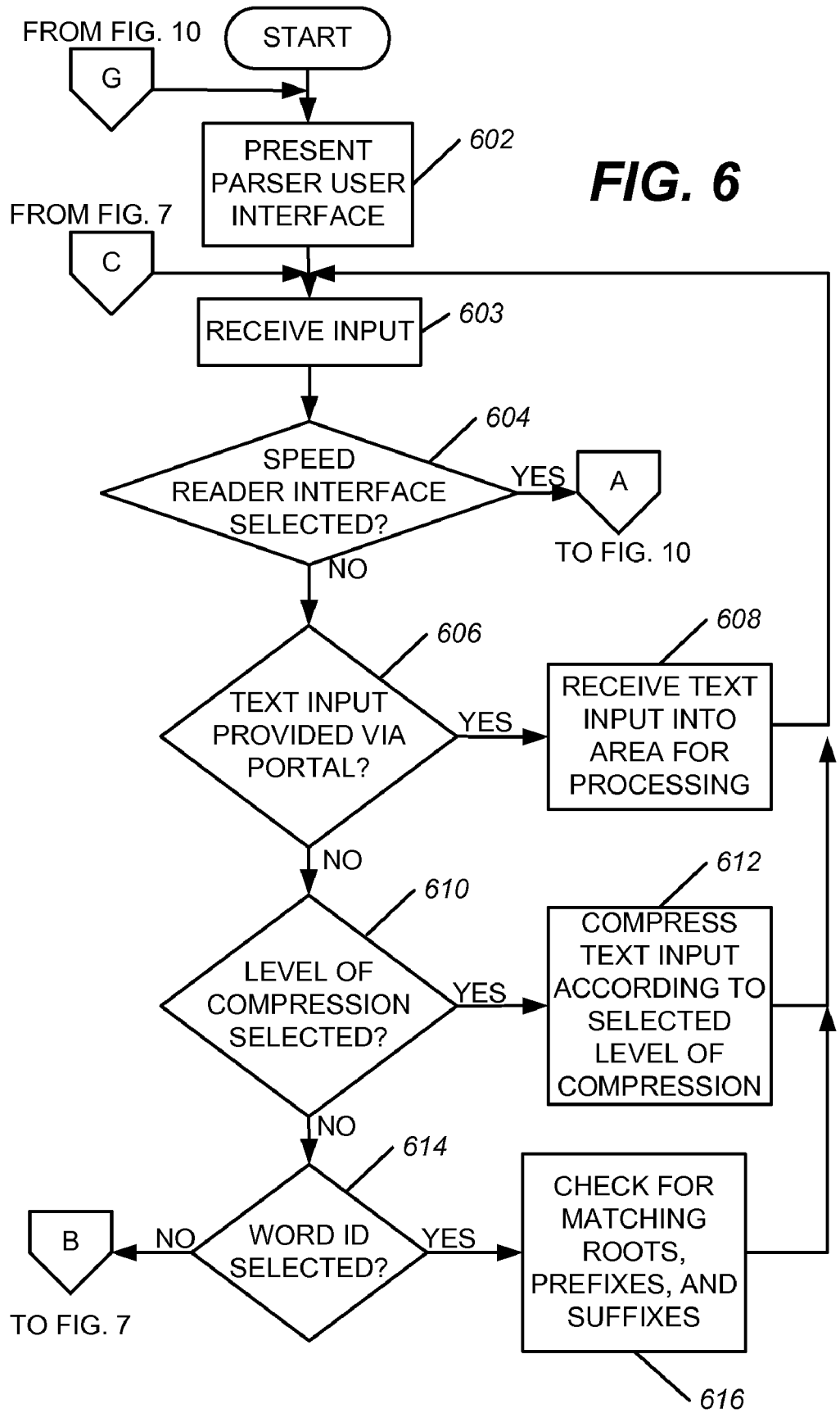
FIGS. 6-9 are flowcharts illustrating exemplary processing associated with a parser user interface in embodiments consistent with the subject matter of this disclosure.
Figure 7:
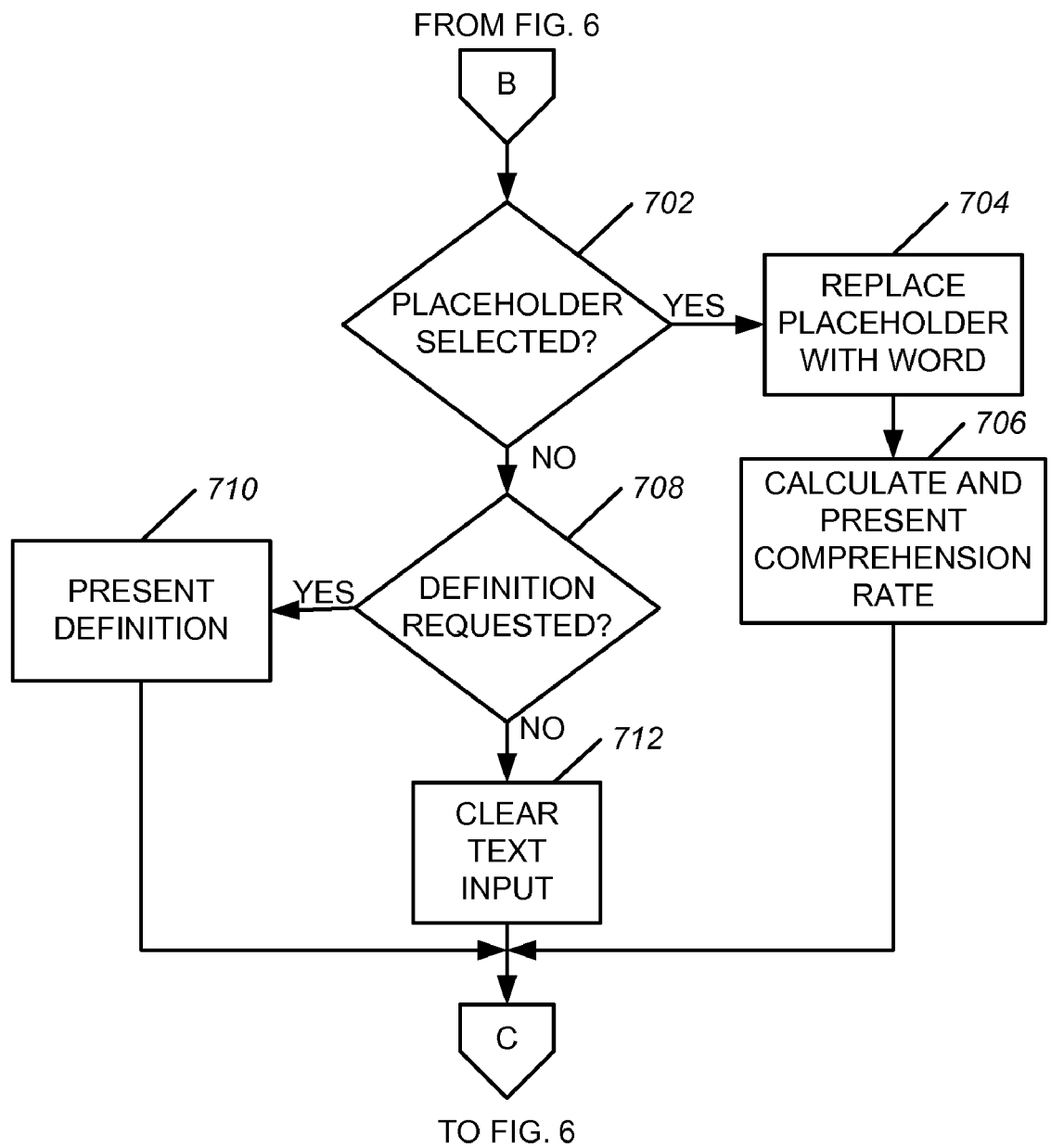

FIGS. 6 and 7 illustrate a flowchart of an exemplary process, which may be performed in embodiments consistent with the subject matter of this disclosure. The process may begin with a user requesting access to the parser user interface and being presented with the parser user interface (act 602). In one embodiment, the user may request access to the parser user interface by entering a specific address via a browser, such as, for example, Microsoft Internet Explorer®, available from Microsoft Corp. of Redmond, Wash., or another browser. The browser may execute on a processing device, such as, for example, user processing device 106, which may communicate with a server, such as, for example, server 104 via a network, such as, for example, network 102. Server 104 may receive the request for access to the parser user interface and may respond with information for displaying the parser user interface. The information for displaying the parser user interface may be received by user processing device 106, which may display the parser user interface via the browser.

Figure 10:
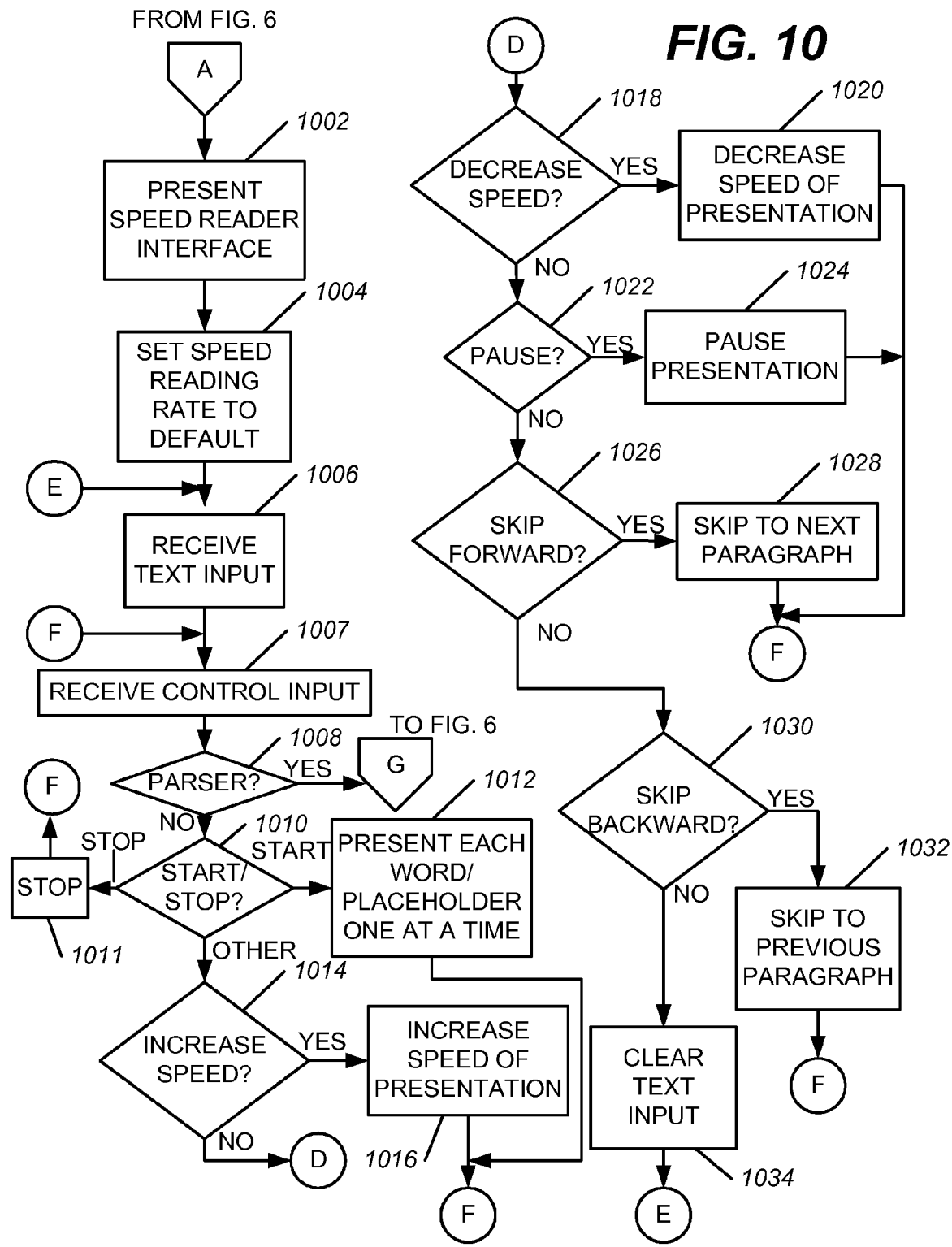
FIG. 10 is a flowchart explaining exemplary processing associated with a speed reader user interface in embodiments consistent with the subject matter of this disclosure.

Next, user processing device 106 may receive input as a result of the user making a selection from the parser user interface or providing other input (act 603). If the user selects a speed reader user interface link, such as, for example, speed reader user interface link 304, then user processing device 106 may send an indication of the selection to server 104, which may determine that the user selected the speed reader user interface link (act 604). Server 104 may then provide information to user processing device 106 for displaying the speed reader user interface. Exemplary processing with respect to the speed reader user interface is illustrated by the flowchart of FIG. 10 and will be discussed in more detail below.

If, during act 604, user processing device 106 determined that the user did not select the speed reader user interface link, then user processing device 106 may determine whether the user provided text input via, for example, input portal 306, or other means (act 606). If user processing device determines that the user provided text input, then user processing device 106 may receive the text input and may provide the text input to server 104 via network 102. Server 104 may receive the text input into an area for processing, such as, for example, an area of memory 230 (act 608). In some embodiments, user processing device 106 may include a speech recognition component for receiving voice input and converting the voice input to text, which may be presented in input portal 306 of the parser user interface and may be provided to server 104 as text input.

If the user selects a level of compression by, for example, selecting one of selectable icons 308, 310, 312, or by another means, then user processing device 106 may send an indication of the selected level of compression to server 104 via network 102 and server 104 may receive the indication of the selected level of compression and may then determine that the selected level of compression was selected (act 610). Server 104 may then compress the text input according to the selected level of compression and may provide a result of the compressing to user processing device 106 for display to the user (act 612).

Figure 8:
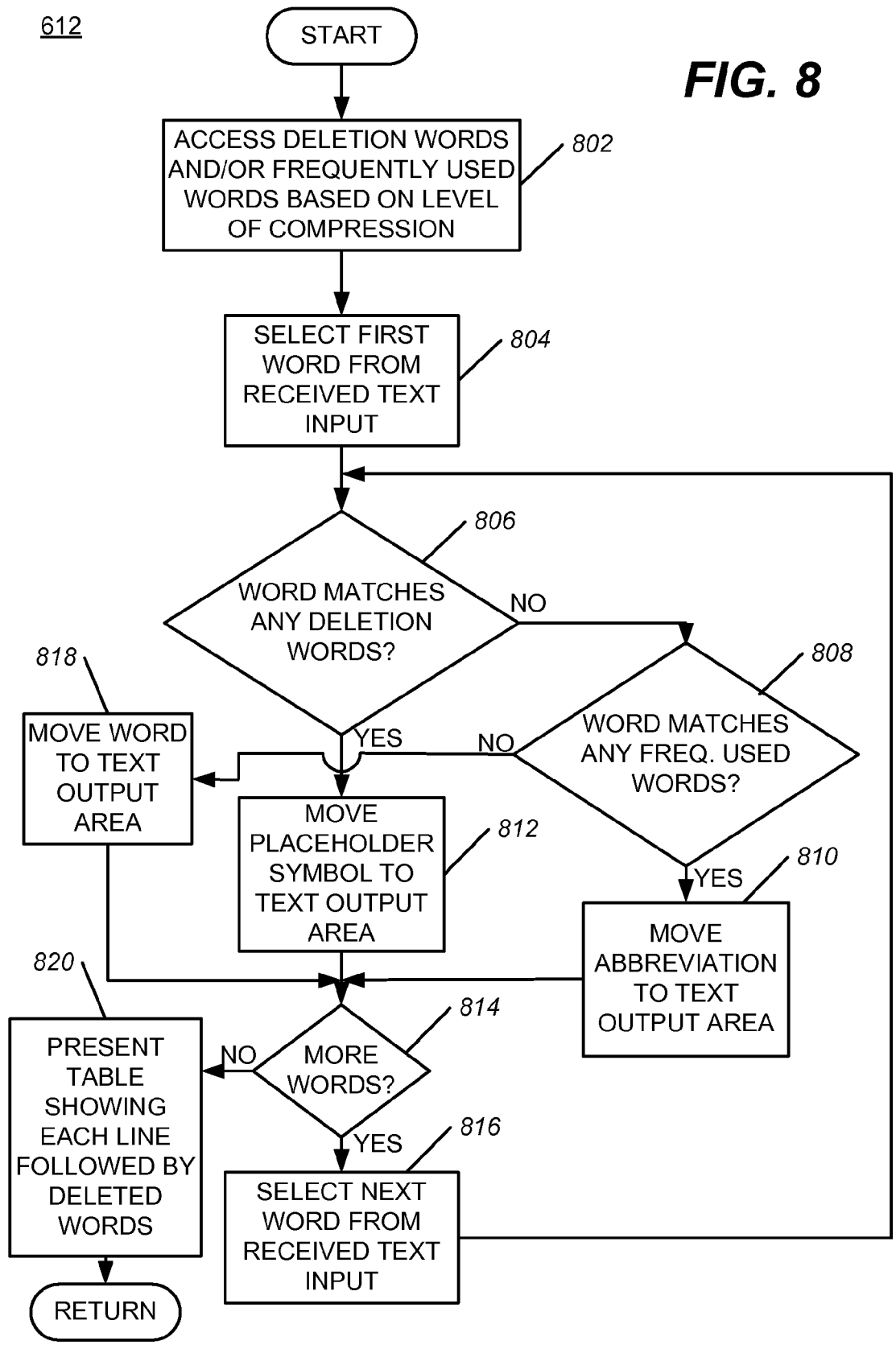

FIG. 8 is a flowchart of an exemplary process, which may be performed by server 104, to compress the text input. The process may begin with server 104 accessing a list of deletion words and/or a list of frequently used words, corresponding to the selected level of compression, from one or more databases, (act 802). Next, server 104 may select a first word from the received text input (act 804). Server 104 may then determine whether the word matches any of the deletion words (act 806).

If, during act 806, server 104 determines that the word matches one of the deletion words, then server 104 may move a placeholder symbol such as, for example, " . . . " or another symbol to a text output area (act 812), which in one embodiment may be included in memory 230 of server 104.

If, during act 806, server 104 determines that the word does not match any of the deletion words, then server 104 may determine whether the word matches any words of the list of frequently used words (act 808). As an example, frequently used words may include "this", "that", "number", "example", "input", etc. In some embodiments, the list of frequently used words may include additional or different words. If server 104 determines that the word matches one of the words from the list of frequently used words, then a corresponding abbreviation may be moved to the text output area (act 810). If, during act 808, server 104 determines that the word does not match any of the words of the list of frequently used words, then server 104 may move the word to the text output area (act 818).

After performing act 810, act 812, or act 818, server 104 may then determine whether there are one or more words of the text input remaining to be processed (act 814). If server 104 determines that there are one or more words of the text input remaining to be processed, then server 104 may select a next word from the text input (act 816) and server 104 may repeat acts 806-814. If, during act 814, server 104 determines that there are no additional words in the text input remaining to be processed, then server 104 may provide, to user processing device 106 for display to the user, the text output and a table showing each line of the text input, including placeholder symbols replacing deleted words and/or corresponding abbreviated representations replacing frequently used words (act 820). In one embodiment, the text output and the table may be displayed in a format as illustrated by language output 320 and table 322 of FIG. 3, in which " . . . " is a placeholder symbol. In other embodiments, a different placeholder symbol may be used.

Returning to FIG. 6, if, during act 610, server 104 determines that none of selectable icons 308, 310, and 312 were selected, then server 104 may determine whether selectable icon 314 is selected (act 614). If server 104 determines that selectable icon 314 is selected, then server 104 may check at least portions of words in the text input to determine whether at least the portions of the words match known roots, prefixes, and suffixes (act 616).

Figure 9:
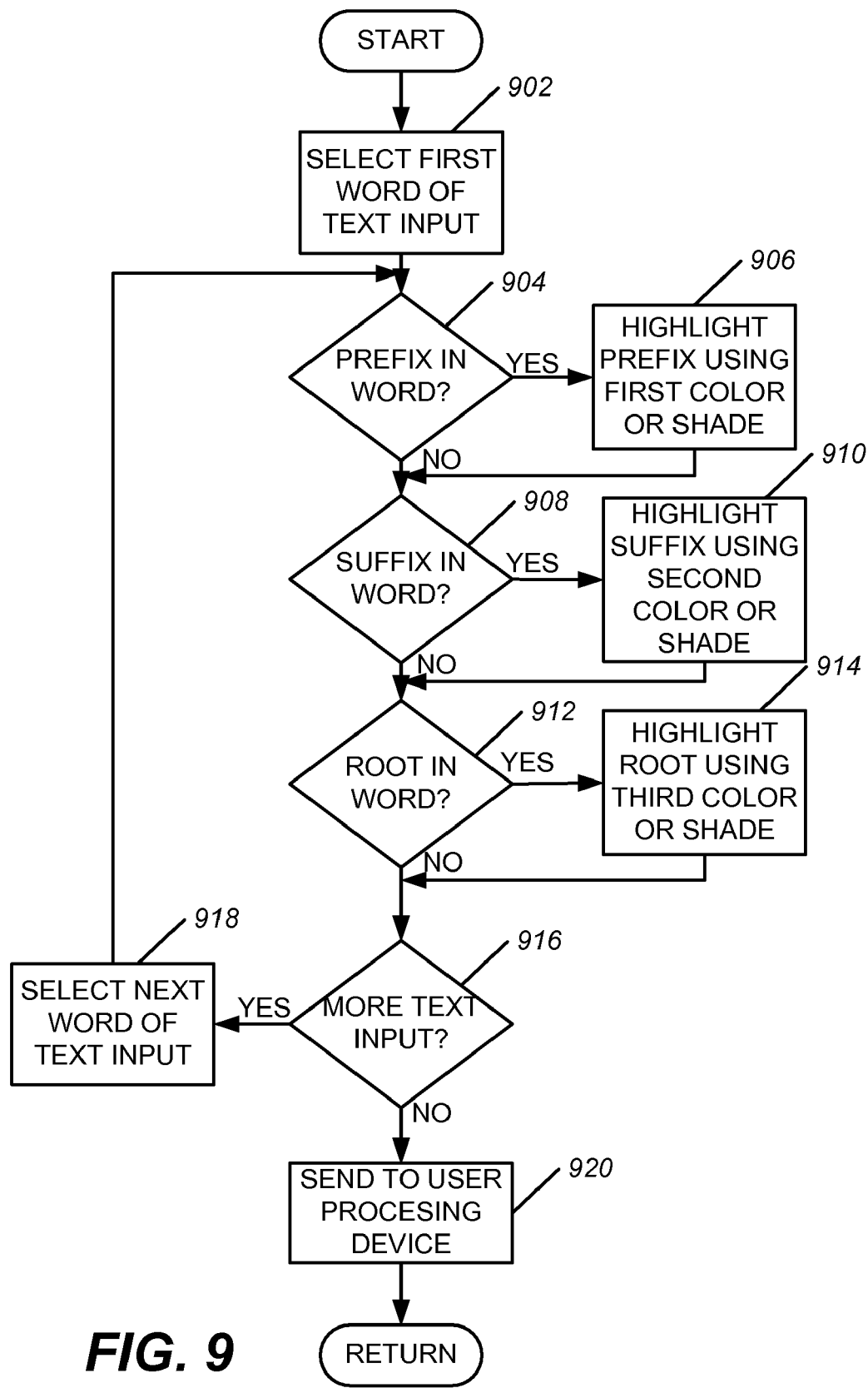

FIG. 9 is a flowchart which illustrates exemplary processing in an embodiment of server 104 performing act 616. Server 104 may begin by selecting a first word of the text input (act 902). Server 104 may then determine whether a beginning portion of the word matches any of the known prefixes (act 904). If server 104 determines that a beginning portion of the word matches one of the known prefixes, then server 104 may save information with respect to the word, including data indicating that the matching portion of the word is to be shaded a first color or shade to indicate a prefix (act 906).

Next, server 104 may determine whether an ending portion of the word matches one of the known suffixes (act 908). If server 104 determines that the ending portion of the word matches one of the known suffixes, then server 104 may save information with respect to the word, including data indicating that the matching portion of the word is to be shaded a second color or shade to indicate a suffix (act 910).

Server 104 may then determine whether a portion of the word includes one of the known roots (act 912). If server 104 determines that the portion of the word includes one of the known roots, then server 104 may save information with respect to the word, including data indicating that the matching portion of the word is to be shaded a third color or shade to indicate a root (act 914).

Next, server 104 may determine whether one or more words remain in the text input for processing (act 916). If server 104 determines that at least one more word remains in the text input for processing, then server 104 may select a next word (act 918) and may repeat acts 904-916. If server 104 determines that no more words remain in the text input for processing, then server 104 may send information about the words, including any shading information to user processing device 106, which may display words and shaded portions of words in a format, as shown by language output 320 of FIG. 4, or in another suitable format (act 920).

Returning to act 614 of FIG. 6, if server 104 determines that selectable icon 314 is not selected, then server 104 may determine whether a placeholder symbol, included in language output 320, was selected (act 702; FIG. 7). If server 104 determines that a placeholder symbol was selected, then server 104 may send information to user processing device 106 to cause the placeholder symbol included in language output 320, to be replaced by a deleted word corresponding to the placeholder symbol (act 704). Server 104 may then calculate a comprehension rate and may send information to user processing device 106 to present the comprehension rate (act 706). For example, if 100 words of the text input were replaced with a placeholder symbol in language output 320, then when the selected placeholder is replaced by the corresponding deleted word, the comprehension rate may be calculated according to:

$$1 - \frac{\text{Number of Placeholders Replaced With Corresponding Deleted Word}}{\text{Original Number of Deleted Words}}$$

Server 104 may then perform act 603 (FIG. 6).

If, during act 702, server 104 determines that a placeholder symbol was not selected, then server 104 may determine whether the user is requesting a definition of a portion of a word such as, for example, a highlighted or shaded prefix, suffix, or root (act 708). The user may indicate a desire for a definition of a portion of a word, by selecting the portion of the word on a display of user processing device 106 by using a pointer or other device. If server 104 determines that the user is requesting a definition of a portion of a word, then server 104 may look up the definition of the portion of the word in a database and may send data, including the definition of the portion of the word, to user processing device 106 for presentation to the user (act 710). In one embodiment, user processing device 106 may display the definition at a particular location of a display such as, for example, definition 408, shown in FIG. 4. Server 104 may then repeat act 603.

If, during act 708, server 104 determines that the user did not request a definition of a portion of the word, then the user may have selected either selectable icon 316 or parser user interface link 302. Server 104 may then clear input portal 306, language output 320, definition 408 (if displayed), and table 322 (act 712) and may send corresponding information to user processing device 106 to update the displayed parser user interface. Server 104 may then repeat acts 603.

Returning to FIG. 6, if during act 604, server 104 determines that the user selected speed reader user interface link 304, then server 104 may send information to user processing device 106 to display a speed reader user interface such as, for example, the exemplary speed reader user interface of FIG. 5 (act 1002; FIG. 10). Server 104 may then send information to user processing device 106 to set a default speed reading rate (act 1004). In some embodiments, the default speed reading rate may be 120 words per minute. In other embodiments, another suitable speed reading rate may be set.

Server 104 may then receive text input from user processing device 106 (act 1006). In some embodiments, server 104 may receive the text input from a last displayed language output 322 of the parser user interface. Alternatively, the user may enter input via an input portal of a speed reader user interface, such as, for example, input portal 524 of FIG. 5. In some embodiments, user processing device 106 may include a speech recognition component for receiving voice input and converting the voice input to text, which may be presented in input portal 524 of the speed reading user interface and may be provided to server 104 as text input.

Server 104 may then receive control input from user processing device 106 (act 1007). The control input may be provided by user processing device 106 as a result of the user selecting a control from the presented speed reader user interface, as will be explained in more detail below. Server 104 may receive input indicating a selected one of the controls selected by the user (act 1007). In the exemplary speed reader user interface of FIG. 5, the controls may be any one of controls 502, 504, 510, 512, 514, 516, 518, 520 and 522.

Server 104 may then determine whether the user indicated a desire to display a parser user interface (act 1008). In some embodiments, the user may indicate the desire to display the parser user interface by selecting parser user interface link 502 from the speed reader user interface. If server 104 determines that the user indicated a desire to display the parser user interface, then server 104 may perform act 602, shown in FIG. 6.

If, during act 1008, server 104 determines that the user did not indicate a desire to display the parser user interface, then server 104 may determine whether the user indicated a desire to start or stop a speed reading operation (act 1010). In various embodiments, the user may indicate a desire to start or stop the speed reading operation by selecting control 510 (FIG. 5). In other embodiments, the user may indicate the desire to start or stop the speed reading operation by other means. If server 104 determines that the user indicated a desire to start the speed reading operation, then server 104 may provide information to user processing device 106 such that user processing device 106 may display each word or placeholder symbol, one at a time, at a given location of a display screen, such as, window 508, as shown in FIG. 5, or another suitable location of the display screen (act 1012). Server 104 may then receive additional control input from user processing device 106 (act 1007).

If, during act 1010, server 104 determines that the user indicated a desire to stop the speed reading operation, then server 104 may send information to the user processing device 106 to stop the speed reading operation (act 1011) and server 104 may receive additional control input from user processing device 106 (act 1007).

If, during act 1010, server 104 determines that the user indicated a desire other than start or stop, then server 104 may determine whether the user indicated a desire to increase a speed reading rate (act 1014). In some embodiments, the user may indicate a desire to increase the speed reading rate by selecting control 514, or by other means. If server 104 determines that the user indicated a desire to increase the speed reading rate, then server 104 may provide information to user processing device 106 to increase a rate at which words are presented via the speed reader user interface (act 1016). Server 104 may then receive additional control input from user processing device 106 (act 1007).

If, during act 1014, server 104 determines that the user did not indicate a desire to increase the speed reading rate, then server 104 may determine whether the user indicated a desire to decrease the speed reading rate (act 1018). In some embodiments, the user may indicate a desire to decrease the speed reading rate by selecting control 512 from the speed reading user interface, or by other means. If server 104 determines that the user indicated a desire to decrease the speed reading rate, then server 104 may provide information to user processing device 106 to decrease the rate at which words are presented via the speed reader user interface (act 1020). Server 104 may then receive additional control input from user processing device 106 (act 1007).

If, during act 1018, server 104 determines that the user did not indicate a desire to decrease the speed reading rate, then server 104 may determine whether the user indicated a desire to pause a speed reading operation. In some embodiments, the user may indicate a desire to pause the speed reading operation by selecting control 516 from the speed reading user interface, or by other means. If server 104 determines that the user indicated a desire to pause the speed reading operation, then server 104 may send information to user processing device 106 to pause the speed reading operation (act 1024).

If, during act 1022, server 104 determines that the user did not indicate a desire to pause the speed reading operation, then server 104 may determine whether the user indicated a desire to skip forward to a position after a current position, such as, for example, a first word of a next paragraph, or other position (act 1026). In some embodiments, the user may indicate a desire to skip forward by selecting control 520 from the speed reading user interface, or by another means. If server 104 determines that the user indicated a desire to skip forward, then server 104 may provide information to user processing device 106 to cause the speed reading operation to skip forward to the position after the current position, such as, for example, the first word of a next paragraph, or other position (act 1028). Server 104 may then receive additional control input from user process device 106 (act 1007).

If, during act 1026, server 104 determines that the user did not indicate a desire to skip forward, then server 104 may determine whether the user indicated desire to skip backward to a previous position, such as, for example, a first word of a previous paragraph, or other position (act 1030). In some embodiments, the user may indicate a desire to skip backward by selecting control 518 from the speed reading user interface, or by another means. If server 104 determines that the user indicated a desire to skip backward, then server 104 may send information to user processing device 106 to cause user processing device 106 to skip backward to a previous position, such as, for example, the first word of the previous paragraph, or other position (act 1032). Server 104 may then receive additional control input from user process device 106 (act 1007).

If, during act 1030, server 104 determines that the user did not indicate a desire to skip backward, then server 104 may assume that the user indicated a desire to clear input portal 524 (by selecting control 522, by selecting speed reader user interface link 504, or by another means). Server 104 may then clear all input and may send information to user processing device 106 to clear displayed input of input portal 524 (act 1034). Server 104 may then receive additional text input from user processing device 106 (act 1006).

The processing described with reference to FIG. 10 is only exemplary. In other embodiments, variations of the processing may be implemented. For example, in some embodiments, receiving of a control input may be processed directly by user processing device 106, in some cases, thereby eliminating, at least some communication between user processing device 106 and server 104. In such embodiments, for example, when the user selects a control such as, for example, control 510, 512, 514, 516, 518 or 520 user processing device 106 may directly perform an associated operation without communicating information with respect to the selection of one of the controls to server 104. For example, upon selection of control 510, user processing device 106 may start or stop the speed reading operation. Upon selection of control 512 or 514, user processing device 106 may decrease or increase, respectively, the speed reading rate. Upon selection of control 516, user processing device 106 may pause the speed reading operation. Upon selection of control 518 or 520, user processing device 106 may cause the speed reading operation to skip to a first word of a previous paragraph, or a first word of a next paragraph, respectively.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

I claim as my invention:

1. A machine-implemented method for compressing language input, including a plurality of words, the machine-implemented method comprising:
receiving the language input including the plurality of words;

determining whether respective ones of the plurality of words match any of a plurality of words to be deleted;

copying ones of the plurality of words of the language input to language output when the ones of the plurality of words do not match any of the plurality of words to be deleted;

copying a placeholder symbol to the language output for each of the ones of the plurality of words that match any of the plurality of words to be deleted;

receiving a selection of a portion of a word included in the language output; and providing a definition relating to the selected portion of the word, wherein the machine-implemented method is performed by a processing device.

2. The machine-implemented method of claim 1, further comprising:

determining whether respective ones of the plurality of words of the language input match any of a plurality of words to be abbreviated; and copying a corresponding abbreviated word to the language output with respect to each of the respective ones of the plurality of words of the language input that match any of the plurality of words to be abbreviated.

3. The machine-implemented method of claim 2, further comprising:

receiving an indication of a desired level of compression, the indicated desired level of compression determining the plurality of words to be deleted and the plurality of words to be abbreviated.

4. The machine-implemented method of claim 3, wherein:

when the desired level of compression is a first level of compression, the plurality of words to be deleted include articles, and when the desired level of compression is a second level of compression, the plurality of words to be deleted include the articles and adjectives.

5. The machine-implemented method of claim 1, further comprising:

providing information for presenting the language output at a configurable rate, one word at a time.

6. The machine-implemented method of claim 1, further comprising:

receiving information with respect to a selection of a respective placeholder symbol included in the provided language output; and providing information for replacing the respective placeholder symbol in the language output with at least one of the plurality of words corresponding to the respective placeholder symbol.

7. The machine-implemented method of claim 1, wherein the receiving a selection of a portion of a word included in the language output further comprises:

receiving a selection of a prefix, a root, or a suffix of the word included in the language output.

8. A processing device comprising:

at least one processor; and a memory connected to the at least one processor, the memory comprising:

instructions for receiving language input including a plurality of words, instructions for producing and displaying language output based on the received language input, instructions for receiving a selection of a portion of a word included in the language output, instructions for providing a definition relating to the selected portion of the word, and instructions for presenting, one word at a time at a given rate, the plurality of words of the language output or the plurality of words of the received language input.

9. The processing device of claim 8, wherein the memory further comprises:

instructions for skipping to a different position in the language input for presentation, in response to receiving a command to skip to the different position in the language input.

10. The processing device of claim 8, wherein the memory further comprises:

instructions for adjusting the given rate of the presenting of the plurality of words of the received language input or the plurality of words of the language output in response to receiving a command to adjust the given rate.

11. The processing device of claim 8, wherein the instructions for receiving the language input further comprise:

instructions for receiving the language input as speech input including the plurality of words, and instructions for converting the speech input to text.

12. The processing device of claim 8, wherein the instructions for presenting the received language input or the language output further comprise:

instructions for displaying, at a same given position of a display screen, each of the words of the language input or the language output, one word at a time.

13. The processing device of claim 8, wherein instructions for receiving the language input further comprise:

instructions for receiving the language input as text placed into a displayed portal.

14. A machine-implemented method comprising:

providing information for presenting a user interface to a user, the user interface including a portal for textual input;

receiving the textual input, provided via the portal, into a storage medium, the received textual input including a plurality of words;

searching for at least particular ones of articles or adjectives included in the plurality of words included in the storage medium;

replacing the at least particular ones of the articles or the adjectives found in the plurality of words in the storage medium with at least one placeholder symbol;

providing information for presenting textual output to the user, the textual output including at least some of the plurality of words and the at least one placeholder symbol from the storage medium after performing the replacing;

receiving a selection of a portion of a word included in the textual output; and providing a definition relating to the selected portion of the word.

15. The machine-implemented of claim 14, wherein the presented user interface includes at least one selectable icon for selecting a level of compression from among a plurality of levels of compression, the selected level of compression determining which of the plurality of words included in the storage medium are to be replaced with the at least one placeholder symbol.

16. The machine-implemented method of claim 15, wherein:

the selected level of compression further determines which of the plurality of words included in the storage medium are to be replaced with a corresponding abbreviated representation, and the textual output includes the corresponding abbreviated representation.

17. The machine-implemented method of claim 14, further comprising:

receiving information with respect to a selection of one of the at least one placeholder symbol in the textual output; and replacing the selected one of the at least one placeholder symbol in the textual output with a corresponding one of the replaced at least particular ones of the articles or the adjectives, as a result of the receiving of the information with respect to the selection of the one of the at least one placeholder symbol in the textual output.

18. The machine-implemented method of claim 14, wherein:

the user interface includes a link to a speed reading user interface, the machine-implemented method further comprising:

providing information for presenting the speed reading interface as a result of receiving information with respect to a selection of the link to the speed reading interface, the presented speed reading interface including a text input portal; and providing information for displaying, at a same given location of a display screen and at a given rate, one word or symbol at a time from the text input portal.

19. The machine-implemented method of claim 18, wherein:

the text input portal includes text from the presented textual output to the user, and the displaying of one word or symbol at a time further comprises displaying respective ones of the at least one placeholder symbol corresponding to the replaced at least particular ones of the articles or the adjectives.

20. The machine-implemented method of claim 18, further comprising:

receiving information with respect to a selection of a selectable icon from the speed reading user interface to adjust the given rate.

\* \* \* \* \*